Nov. 29, 1960     H. STROHMEIER     2,962,579
METHOD OF WELDING
Filed Aug. 22, 1957
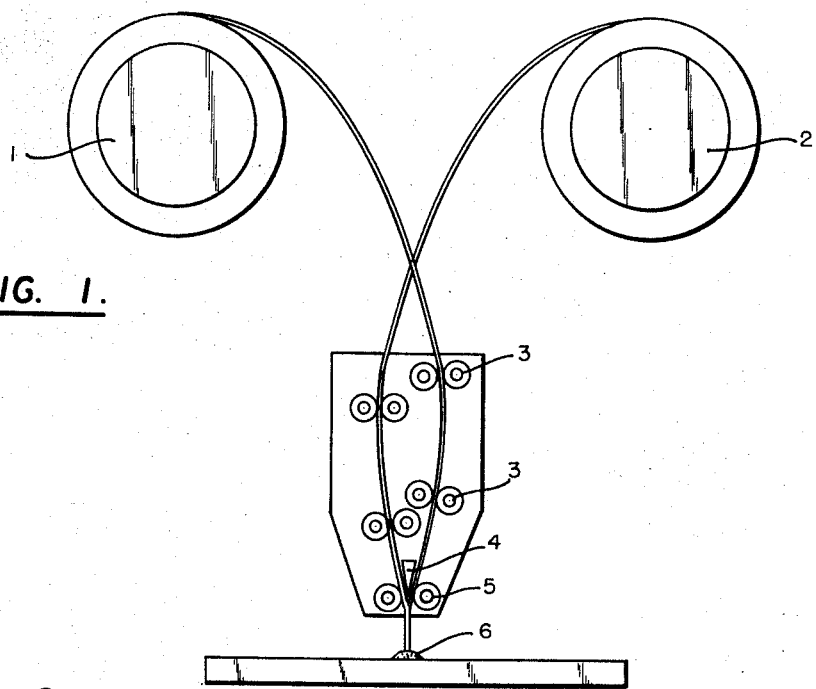
FIG. 1.
FIG. 2.
FIG. 3.
FIG. 4.
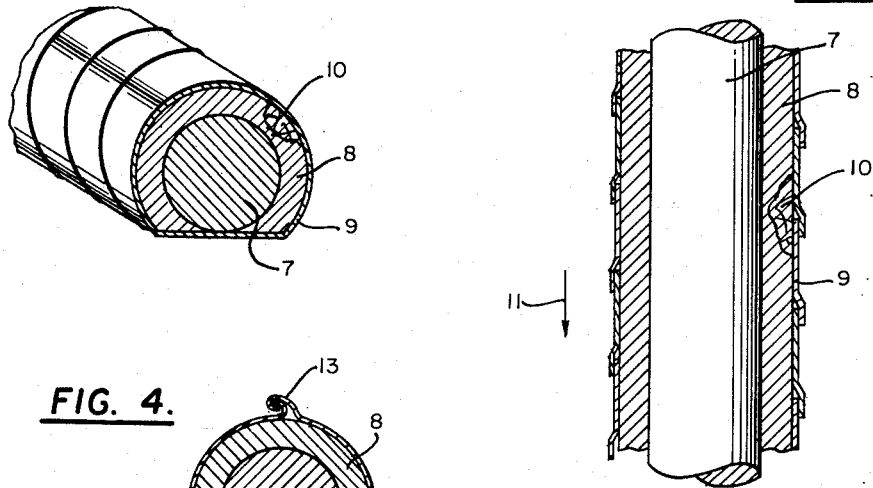
INVENTOR
Harald Strohmeier
ATTORNEYS United States Patent Office 2,962,579
Patented Nov. 29, 1960

2,962,579

METHOD OF WELDING

Harald Strohmeier, Kapfenberg, Styria, Austria, assignor to Gebr. Bohler & Co. Aktiengesellschaft, Vienna, Austria Filed Aug. 22, 1957, Ser. No. 679,582

Claims priority, application Austria Oct. 11, 1955

2 Claims. (Cl. 219—137)

This application is a continuation in part of my application, Serial No. 613,467, filed October 2, 1956, now abandoned, and relates to a method of welding which comprises feeding two substantially identically shaped welding wires of substantial length and having each a conductive core and a coating having a cross-sectional shape of a ring lacking a segment the radial height of which is equal to the radial thickness of the coating past current supply means contacting said cores where they are uncoated due to the absence of said segment-shaped cross-sectional parts of the coatings, subsequently joining said cores at said uncoated portions to form a single, totally coated electrode, and feeding said electrode to a point of welding. This method is basically disclosed and claimed in my application, Ser. No. 468,504, filed November 12, 1954, entitled "Welding Process," and Patent No. 2,824,951. In a preferred embodiment of this method each of the wires is fed past said current supply means along an arcuate path and is then bent in a sense opposite to the curvature of said arcuate path, whereby the cores are held together by the resiliency imparted to said wires due to their arcuate and reversely bent configuration.

This method involves a repeated bending of the welding wires, which has caused in many cases the coating material to spring away from the core so that core wires having defective coatings reached the point of welding and gave improper welds.

According to the invention the springing of the coating material from the core wire is prevented by taping each of the coated welding wires with inorganic material, e.g., with a metal foil wound around each core wire.

The invention is illustrated in the accompanying drawings, in which

Fig. 1 is a diagrammatic view of a welding set-up,
Fig. 2 is a cross-sectional view of a welding wire taped with a foil,
Fig. 3 is a longitudinal sectional view of the wire shown in Fig. 2, and
Fig. 4 is a cross-sectional view showing a coated welding wire having a longitudinally folded foil.

With reference to Fig. 1, each of the two coils 1 and 2 consists of a welding wire having a conductive core and a coating having a cross-sectional shape of a ring lacking a segment the radial height of which is equal to the radial thickness of the coating. Each of these wires is continuously withdrawn from its coil and is fed by means of guide rollers and driven feed rolls 3 to a wedge-shaped slide rail 4. This slide rail supplies current to the two wires, which contact the rail with their uncoated portions, and guides the two welding wires together to contact each other at said uncoated portions. The wires are then urged toward each other by pressure rolls 5, which are disposed just above the point of welding 6. The welding proceeds in the direction of the axis of the electrode formed by the two joined wires. To this end the welding apparatus or the workpiece to be welded may be moved as required.

It is apparent from Fig. 1 that each of the wires 1 and 2 is fed along an arcuate path to the slide rail 4 and past the same and is then bent at the respective pressure roll 5 in a sense opposite to its arcuate path so that the cores are held together by the resiliency imparted to said wires due to their arcuate and reversely bent configuration.

In the previous practice of this method any sharp curvature of the welding wire during its movement to the point of welding had to be avoided to prevent the coating from springing from the core wire. For this reason the slide rail had to be designed so as to slightly straighten the wires coming from the coils and then to lead the wires together so that the wires tend to spring back to their original curvature, whereby the wires are urged one against the other. This may simply be achieved by arranging each of the coils of welding wire on that side of the welding device which is opposite to the side of the slide rail which is engaged by said wire.

The measures which were previously adopted to prevent coating material from springing from the wire have not been successful. According to the invention the coated wires are taped to prevent a loss of coating material. In the process described hereinbefore the coated and taped wires may then be bent as desired without loss of parts of the coating material. Even wires having a very brittle coating may be used for welding with good success, in spite of the cracks in the coating below the tape, because the cracked parts cannot fall away.

In order to enabled a supply of current to the core wire in spite of the tape the latter must consist of electrically conducting material, e.g. of a metal foil, or must cover only the coating while leaving free the uncoated portion of the wire. In a preferred embodiment of the wire the coating is helically wound with overlapping turns of aluminum wire.

The welding wire is wound with helical or cross-wise turns of tape. Alternatively, the foil may be longitudinally applied to the wire and the sides may be bent around the wire and connected by a fold or notches. In continuous operation it may be of advantage to cement the tape longitudinally to the coating material whereas the uncoated portion of the core wire is not covered by the foil. Thicker foils will retain the coating material even if they are not cemented, particularly if a sufficiently large number of guide rollers are provided. If the tape is to be applied to the coating material while the same is still moist, openings must be provided in the tape to enable the drying of the coating material.

The foils consist suitably of a material which complements the material of the core wire or the coating material with respect to the welding properties. For instance, an alloying additive to the core wire or a constituent of the coating material, such as iron, or a deoxidizer, such as aluminum, tin or zinc, may be used as foil material.

These foils are applied to the welding wire after the latter has been manufactured, suitably after the coating has been dried.

With reference to Figs. 2 and 3, the conductive core wire 7 is covered throughout its length by a coating 8 having a cross-sectional shape of a ring lacking a segment the radial height of which is equal to the radial thickness of the coating so that the core wire 7 is bare at one point of the periphery. A tape 9 is helically wound with partly overlapping turns around the coated wire. Because the turns of the tape overlap the cracked portions 10 of the coating cannot fall away and the turns of the wound tape cannot gape at sharp bends of the wire.

The welding wire is fed to the point of welding in the direction of the arrow 11 to prevent the tape from unwinding in the rearward direction.

Fig. 4 shows a welding wire having a conductive core 7, a coating 8, and a tape 12, which has been longitudinally applied parallel to the wire, whereafter the longitudinal sides of the tape were bent around the wire and then folded together.

I claim:

1. A method of welding which comprises providing two substantially identically shaped welding wires of substantial length and each having a conductive core and a nonconductive coating having the cross-sectional shape of a ring lacking a segment, the radial height of which is equal to the radial thickness of the coating, so that each of said cores has an uncoated longitudinal surface portion due to the absence of said segment-shaped cross-sectional part of said coating, said coating having edge portions extending on both sides of said uncoated surface portions and having a smaller radius of curvature than the rest of said coating, each of said wires further comprising tape means of electrically conducting material held on said edge portions and on both sides thereof, said tape means having a contact portion covering said uncoated longitudinal surface portion of said core, said method comprising feeding said wires past current supply means to cause the latter to contact said contact portions of said tape means, subsequently flexing and forcing said wires together to join them at said contact portions and thus form a single, totally coated electrode, said tape means preventing cracking of the edge portions incident to flexing and forcing of the wire, and feeding said electrode to a point of welding.

2. A method as set forth in claim 1, in which each of said taped wires is fed past said current supply means along an arcuate path and is then bent in a sense opposite to the curvature of said arcuate path so that the cores are held together by the resiliency imparted to said wires due to their arcuate and reversely bent configuration.

References Cited in the file of this patent

UNITED STATES PATENTS

| 1,376,963 | Mills | May 3, 1921 |
| 1,441,685 | Jones | Jan. 9, 1923 |
| 1,525,840 | Weed | Feb. 10, 1925 |
| 1,643,254 | Miller | Sept. 20, 1927 |
| 1,814,878 | Weed | July 14, 1931 |
| 1,995,584 | Sarazin | Mar. 26, 1935 |
| 2,067,206 | Ross | Jan. 12, 1937 |
| 2,083,309 | Applegate | June 8, 1937 |
| 2,469,790 | Schmerber | May 10, 1949 |
| 2,490,023 | Bernard | Dec. 6, 1949 |
| 2,802,930 | Ronay | Aug. 13, 1957 |
| 2,824,951 | Strohmeier | Feb. 25, 1958 |

FOREIGN PATENTS

| 441,834 | Great Britain | Oct. 23, 1934 |
| 609,848 | Germany | Feb. 26, 1935 |